3,378,311
BRAKE CYLINDER RELEASE VALVE
Carl D. Wright, Jr., Pittsburgh, Pa., assignor to Westinghouse Air Brake Company, Wilmerding, Pa., a corporation of Pennsylvania
Filed Sept. 29, 1965, Ser. No. 491,112
8 Claims. (Cl. 303—69)

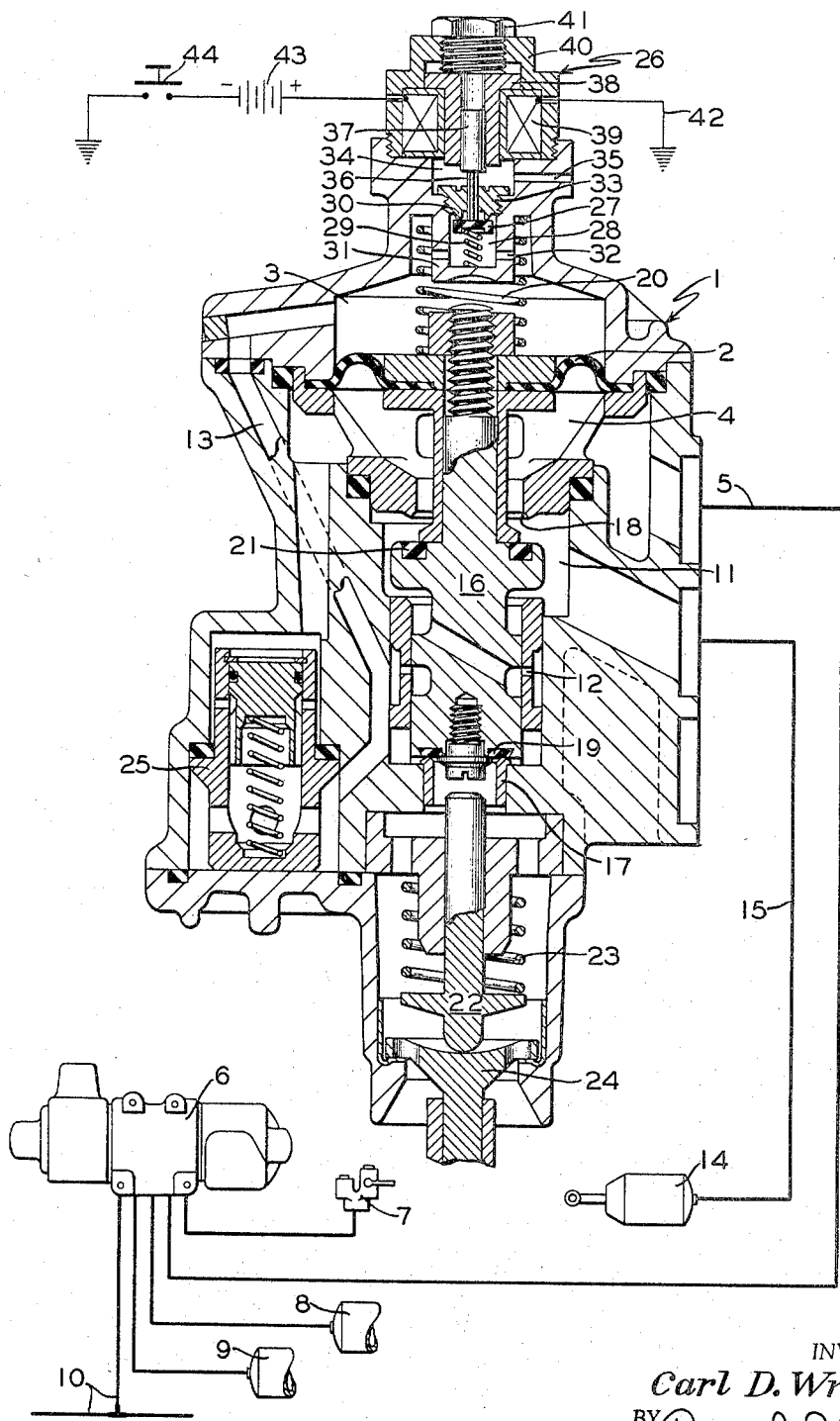

ABSTRACT OF THE DISCLOSURE

A brake cylinder release valve adapted for optional manual operation or electrically controlled operation to vent pressure from a brake cylinder during a brake application without concurrently reducing the pressure in the supply reservoir. A solenoid operated valve vents the pressure balancing chamber of the lock-up piston of a conventional type brake cylinder release valve to effect actuation of the release valve to brake cylinder releasing position.

---

Brake cylinder release valve devices have been heretofore employed extensively for manually releasing the brakes on each car individually; a typical brake cylinder release valve device, of the manually operated type is disclosed in U.S. Patent No. 3,001,833 issued to W. B. Kirk which enables fluid under pressure to be locally released from each brake cylinder device on the car to release the brakes while the car is attached to or detached from the train without depleting the fluid under pressure in the usual auxiliary and emergency reservoirs on the car. The heretofore known brake cylinder release valve devices usually comprise valve means biased to a normal position to connect each brake cylinder device with a brake cylinder pipe that is connected to the brake cylinder passageway in the control valve device, for example, the well-known AB control valve device, so that fluid under pressure will normally be supplied to and released from each brake cylinder device by the control valve device responsively to variations in the pressure of the fluid in the usual brake pipe that extends from car to car throughout the train. The valve means of the conventional brake cylinder release valve device is manually actuatable to a release position to disconnect the brake cylinder pipe that is connected to the brake cylinder passageway in the control valve device from each brake cylinder means and to vent the brake cylinder means to atmosphere completely through the brake cylinder release valve so that the fluid under pressure in the brake cylinder means may be reduced to atmospheric pressure without depleting the pressure of the fluid in the reservoirs if they are still connected to the brake cylinder pipe through the AB type control valve device.

The primary purpose of this invention is to provide a brake cylinder release valve means that can be operated either by actuating the conventional valve operating rod or by electrical controls from an electric power source which can be either self-contained on the car or train or external of the car in the yard or both.

The novel brake sylinder release valve device embodying the invention is essentially a conventional form of a manually operated brake cylinder release valve device modified in a novel manner to provide for electrical control as well. To achieve this modification, a solenoid type operated valve is provided to vent the usual balancing pressure chamber at one side of the lock-up diaphragm type piston, thereby to effect a pressure differential thereon to actuate the valve device from its normal brake cylinder communicating position to a brake cylinder venting position. Restoration of the valve device to its brake cylinder communicating position is effected pneumatically by release of the fluid under pressure from the pressure chamber on the side of the diaphragm type piston opposite the balancing device upon restoration of the standard brake control valve to its brake release position.

In the accompanying drawings: FIG. 1 is a longitudinal sectional view of the brake cylinder release valve means constructed according to the invention together with a simple line diagram of its use in the brake system and its accompanying control system.

The brake cylinder release valve device comprises a sectionalized casing and valve body 1, piston 2, preferably of the diaphragm type, reciprocably mounted in the casing and having at one side a so-called balancing chamber 3 and having at the other side an inlet or a control chamber 4 that is connected to the brake cylinder control pipe 5. The brake cylinder control pipe 5 in turn is connected to the AB type brake control valve 6. Appropriately connected to the control valve 6 are conventional retainer valve 7, emergency reservoir 8, an auxiliary reservoir 9 and brake pipe 10. Adjacent to the inlet chamber 4 is an outlet chamber 11 which is connected to chamber 3 by way of a choke 12, passage 13 and directly connected to brake cylinder 14 by way of brake cylinder pipe 15. Piston 2 has attached thereto a spool valve 16 which reciprocates between two seats 17 and 18 respectively. Carried on spool valve 16 is a valve 19 which abuts tubular valve seat 17 and is held in this normal position by spring 20. A valve 21 formed at the opposite end of spool valve 16 abuts annular valve seat 18. A stem 22, slidably mounted in a bore in the body 1, extends coaxially within the tubular valve seat 17 and a spring 23 biases stem 22 into contact with a disc-shaped head on a manually operable lever 24 which is suitably rockably mounted in the body 1. A reset valve means 25 heretofore known, is also provided for insuring restoration of the spool valve 16 to its normal or brake cylinder communication position notwithstanding the use of a pressure retainer, such as retainer 27. Reset valve means 25 functions, in manner well known, responsive to reduction of pressure in control chamber 4 to a certain low value by operation of the control valve 6 to brake release position, to bleed pressure retained in control chamber by the retainer to atmosphere past the unseated valve 19, restoration of spool valve 16 to normal position being effected by spring 20.

When the control valve 6 is operated from a brake release position, with the brake cylinder release valve in its open position, as shown in the drawing, to a service or emergency application position, fluid under pressure flows from the reservoirs 8 and 9 through valve 6 into control pipe 5, control chamber 4, through chamber 11, brake cylinder pipe 15 and into brake cylinder 14, thereby effecting a brake application. When fluid under pressure is to be released from brake cylinder 14, lever 24 is manually rocked to shift stem 22 upwardly and thus effect unseating of valve 19 on spool valve 16. Fluid under pressure from chambers 3, 4 and 11 begins to flow toward tubular shaped seat 17, and due to choke 12 the escape of fluid under pressure from chambers 4 and 11 is restricted. The more rapid rate at which fluid under pressure from chamber 3 escapes past exhaust valve 19 and seat 17 to atmosphere creates a pressure differential across diaphragm 2 which causes the diaphragm to shift in the direction of the lower pressure thus carrying the spool valve 16 with it and sealing chamber 4 from chamber 11 due to seating of valve 21 against seat 18. Chamber 11 and brake cylinder 14 continue to exhaust by way of choke 12 and past unseated valve 19 to atmosphere. In this way fluid under pressure is exhausted from the brake cylinder and the brake application is released. So long as sufficient pressure is maintained in chamber 4, the spool valve 16 remains locked-up in the aforedescribed brake cylinder venting position.

To this point the aforementioned release of the brake application in the system corresponds to the manner in which a conventional brake cylinder release valve functions. According to the present invention, however, the brake cylinder release valve is further provided with an electro-magnet valve 26. The electro-magnet valve 26 comprises a valve 27 enclosed in chamber 28 between the spring 29 and seat 30. A boss 31 has a plurality of ports 32 which communicate chamber 28 to chamber 3. Valve 27 is held close against the seat 30 which is integral with a plug 33 that is threaded and screwed into the valve body 1, thus creating chamber 34 above it which in turn is vented to atmosphere by way of passage 35 also in the valve body 1. Plug 33 has a central bore in which is a fluted stem 36 attached to a plunger 37 that reciprocates inside a liner 38. Liner 38 is of non-magnetic material and the plunger 37 is of soft iron or similar magnetic metal and is separated by the liner 38 from the winding 39 of the electro-magnet. The winding 39 is held in the valve body by a frame 40 which is externally threaded at one end and screwed into the valve body. Liner 38 is held in place by the plug 41 which is threaded and screwed into a bore in the end of said frame 40. One terminal of the winding 39 of electro-magnetic valve 26 is grounded by wire 42 and the other terminal is connected to a suitable source, such as a battery 43, via a simple circuit including a push-button switch 44. Closure of switch 44 thus effects energization of the winding 39.

Let it again be assumed that the brake cylinder release valve is in its open position as shown in the drawing and that a brake application has been made. This has been brought about by the control valve 6 being placed in an emergency or service application position, in the manner before mentioned, which communicates the appropriate passages and subsequently supplies fluid under pressure to brake cylinder 14. Release of the brake application is effected by energizing the winding of the electro-magnet valve device of the brake cylinder release valve by momentarily closing switch 44. When switch 44 is closed, the winding of the electro-magnet valve is energized, thereby actuating the plunger 37, from rest, as viewed in the drawing, to move the fluted stem 36 downward overcoming the tension of spring 29 and unseating the valve 27. Unseating of valve 27 causes fluid under pressure to flow from chamber 3 through port 32 and past fluted stem 36 to chamber 34 and through passageway 35 to atmosphere but due to chokes 12, the escape of fluid under pressure from chambers 4 and 11 is restricted. As this rapid fluid flow from chamber 3 occurs, diaphragm 2 will move upwardly due to the differential pressure created between chambers 3 and 4. As the diaphragm 2 moves upward overcoming the force of spring 20, the spool valve 16 is actuated accordingly from its position as shown in the drawing, thus unseating the valve 19 from tubular seat 17 and sealing chamber 4 from chamber 11 by contact of valve 21 against the seat 18. As this occurs, fluid under pressure will flow from the brake cylinder 14 by way of pipe 15 into the chamber 11. Chamber 4 now being closed off, this fluid under pressure will then pass by valve 19 and seat 17 which are now separated then flow past stem 20, spring 23 and to atmosphere.

The brake cylinder release valve may be reset, that is, restored to its normal condition, in the same manner heretofore described in connection with the manual operation of the brake release valve. Reset valve 25 functions in the same manner as heretofore described.

Although a specific embodiment of the invention has been shown and described, it is with full awareness that modifications thereof are possible within the terms of the appended claims.

Having now described the invention, what I claim as new and desire to secure by Letters Patent, is:

1. In a valve means,
 (a) a diaphragm,
 (b) a spool means fitted to said diaphragm,
 (c) chamber means comprising one chamber and another chamber,
 (d) said another chamber being divided into a first chamber and a second chamber,
 (e) choke means between said second chamber and said one chamber,
 (f) electrically controlled orifice means for connection to said chamber means.

2. The valve means of claim 1 having manual means to reciprocate said spool means.

3. The valve means of claim 1 whereby said electrically controlled means is actuated to open the said electrically controlled means thus said one chamber is vented to atmosphere and said second chamber is vented to atmosphere through said choke means and said one chamber and also vented to atmosphere through asid choke means past said spool means directly to atmosphere.

4. In a fluid pressure system, valve means comprising:
 (a) chamber means comprising a first part, second part and a third part,
 (b) spool means concentric thereto,
 (c) said spool means having double valves,
 (d) choke means between said first part and said third part,
 (e) orifice means electrically controlled and connected to said chamber means,
 (f) one of said double valves sealing said first and third parts of said chamber means from said second part of said chamber means while the other of said valves vents the said first and said third parts of said chamber means to atmosphere respectively when said orifice means is opened.

5. The fluid pressure system of claim 4 wherein said spool is fixed to a diaphragm which is also a spacer between said chamber means.

6. Brake cylinder release valve means comprising:
 (a) a casing,
 (b) a piston device forming with said casing a brake pipe control chamber and a pressure balancing chamber on the other side thereof,
 (c) valve means operatively connected to said piston device, said valve means having a normal position in which it establishes a communication between said brake pipe control chamber and a delivery port to which a brake cylinder is adapted to be connected and operative to a different position in which said normal communication is closed and in which a venting communication is opened by way of which fluid under pressure is released from said delivery port and connected brake cylinder,
 (d) means between said control chamber and balancing chamber providing a restricted communication, said restricted communication being opened under control of said valve means in its said normal position and being closed in the said different position of said valve means,
 (e) electro-responsive valve means operative when energized to vent said balancing chamber to atmosphere at a rapid rate, thereby producing a differential fluid pressure therein with respect to said control chamber effective to operate said piston device and correspondingly said valve means from its normal position to its different position,
 (f) manually operated means for actuating said valve means from its said normal position to its said different position independently of operation of said electro-responsive valve means, and means providing a communication between said balancing chamber and atmosphere under control of said valve means which communication is opened only when said valve means is in its different position, thereby producing an unbalanced fluid pressure on said piston device and effective to hold said valve means in its different position notwithstanding return of the manually operated means to its non-operative position.

7. In a valve means,
(a) a diaphragm,
(b) a spool means fitted to said diaphragm,
(c) one chamber on one side of said diaphragm and another chamber on the other side of said diaphragm,
(d) said another chamber comprising a first chamber and a second chamber,
(e) choke means between said second chamber and said one chamber,
(f) orifice means connected to said one chamber whereby fluid from said one chamber is vented to atmosphere and fluid from said another chamber is choked by said choke means as it flows into said one chamber thus causing said diaphragm to move said spool thus sealing off said first chamber from said second chamber of said another chamber, and
(g) electro-magnet means for actuating said orifice means.

8. In a fluid pressure system, valve means comprising:
(a) chamber means comprising a first part, second part and a third part,
(b) spool means concentric thereto and having double valves,
(c) orifice means connected to said chamber means,
(d) choke means between said first part and said third part,
(e) one of said double valves sealing said first and said third parts of said chamber means from said second part of said chamber means while the other of said valves vents the said first and said third parts of said chamber means to atmosphere respectively when the said orifice means is opened and one of said double valves seals said parts from atmosphere while the other of said valves is in a position which allows communication between said parts when said orifice means is closed, and
(f) electrically controlled means for controlling the said orifice means.

References Cited
UNITED STATES PATENTS

| | | | |
|---|---|---|---|
| 1,584,419 | 5/1926 | Ziegler | 303—68 |
| 2,687,921 | 8/1954 | Ferguson et al. | 303—68 |
| 3,001,833 | 9/1961 | Kick | 303—68 |

FERGUSON S. MIDDLETON, *Primary Examiner.*

MILTON BUCHLER, *Examiner.*

T. M. BLIX, *Assistant Examiner.*